United States Patent [19]
Yarbrough

[11] 4,090,686
[45] May 23, 1978

[54] PIPE-LAYING APPARATUS

[76] Inventor: Ted G. Yarbrough, P.O. Box 138, Matthews, Mo. 63867

[21] Appl. No.: 767,999

[22] Filed: Feb. 7, 1977

[51] Int. Cl.² ............................................. B63B 35/04
[52] U.S. Cl. ....................................... 248/49; 61/105; 138/105; 138/106; 248/156
[58] Field of Search .................... 248/49, 85, 156, 440, 248/58; 61/105; 138/105, 106; 214/1 PA

[56] References Cited

U.S. PATENT DOCUMENTS

| | | | |
|---|---|---|---|
| 789,338 | 5/1905 | Shortall | 248/440 X |
| 1,520,840 | 12/1924 | Murray | 138/105 X |
| 1,818,961 | 8/1931 | Kramer | 248/49 |
| 2,978,840 | 4/1961 | Tatsch | 138/106 X |
| 3,568,455 | 3/1971 | McLaughlin et al. | 248/49 X |
| 3,895,496 | 7/1975 | Perrott et al. | 214/1 PA X |

FOREIGN PATENT DOCUMENTS

| | | | |
|---|---|---|---|
| 274,724 | 5/1930 | Italy | 138/105 |
| 30,627 | 8/1933 | Netherlands | 248/440 |

*Primary Examiner*—Roy D. Frazier
*Assistant Examiner*—Rodney H. Bonck
*Attorney, Agent, or Firm*—Edward C. Threedy

[57] ABSTRACT

A device for supporting in selected alignment pipelike elements, such as sectional sewer pipes and drain tiles, in an excavation during the positioning of the pipe therein and prior to the filling in of the excavation with particle material. The device consists of an upright two-legged frame and movable pipe-supporting slides that provide for easy removal of the device from the excavation after it has supported and maintained the alignment of the pipelike elements during the pipe-laying operation.

5 Claims, 5 Drawing Figures

U. S. Patent May 23, 1978 4,090,686
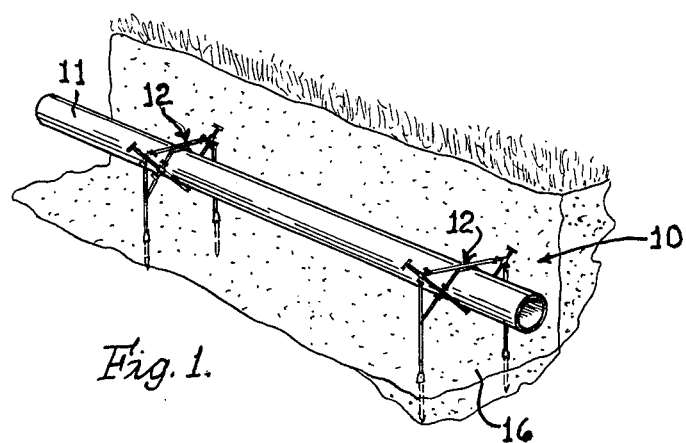
Fig. 1.
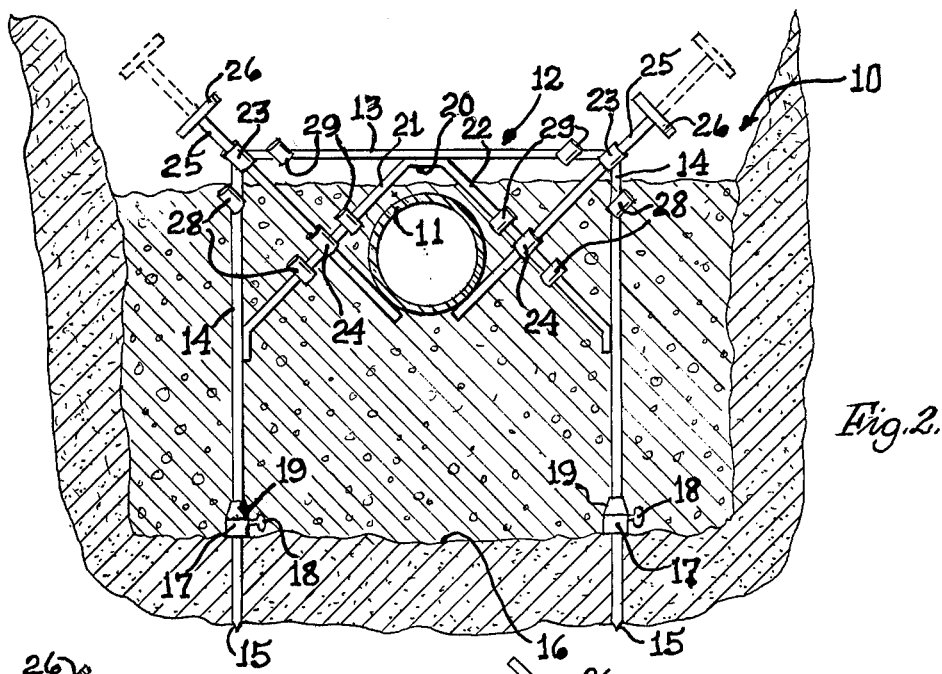
Fig. 2.
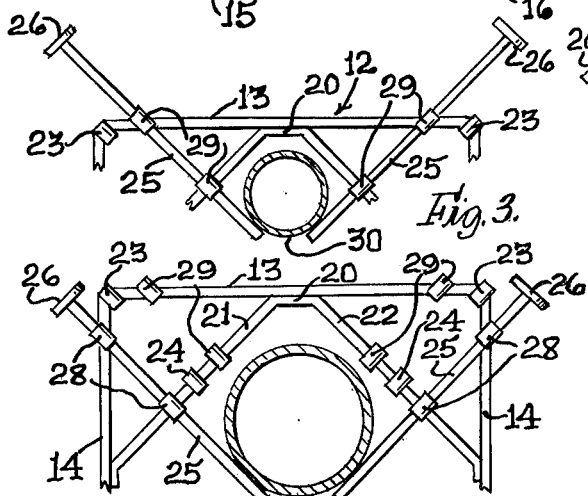
Fig. 3.
Fig. 4.
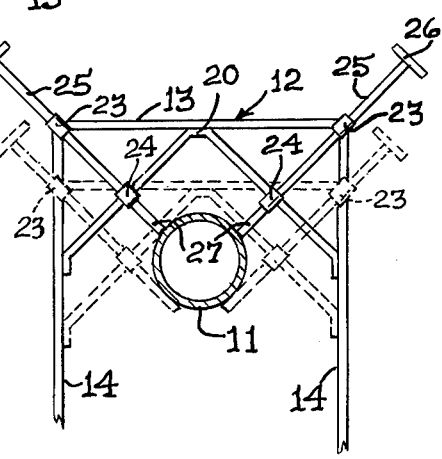
Fig. 5.

PIPE-LAYING APPARATUS

SUMMARY OF THE INVENTION

One of the important objects of this invention is to provide a light-weight, readily portable, yet rigid support for use in laying in an extended aligned formation a series of pipelike sections within an excavation prior to and during the filling of such excavation.

To accomplish the object of this invention there is provided a support consisting of a frame having a horizontal crossbar connected at opposite ends to depending post members. Extending between each post and the crossbar within the frame structure is a strengthening brace providing oppositely angularly disposed struts. Each strut carries a sleeve, the open axis of which extends perpendicularly to the strut and to each other.

At the line of junction of each post to the ends of the crossbar, there is provided a like sleeve positioned coaxially with respect to the sleeve on the confronting strut, with the sleeves adapted to slidably contain pipe-supporting slides. The pipe-supporting slides are free to move through the slides so as to be projected along intersecting lines into pipe-supporting position beneath the frame. After the excavation has been filled to a point where the pipe sections are supported by the fill, the apparatus may be readily removed therefrom without disturbing alignment of the pipe sections or the fill. The apparatus may be provided with a plurality of sleevelike members carried by each of the struts as well as the legs and crossbar of the frame, so that the apparatus may be readily converted to accommodate pipes of varying diameters.

GENERAL DESCRIPTION

The invention will be best understood by reference to the drawings which show the preferred form of construction by which the objects of the invention are achieved and in which:

FIG. 1 is a perspective view of a pipe section mounted in an excavation and supported by the apparatus of the invention;

FIG. 2 is a fragmentary detailed sectional view of the apparatus during a pipe-laying operation in an excavation;

FIGS. 3 and 4 are fragmentary side elevational views of the apparatus showing the same supporting pipe sections of varying diameters; and FIG. 5 is a side elevational view showing the related positions of the pipe-supporting slides and frame projected upon a pipe section so as to support the same.

This invention relates to an apparatus for use in the laying of pipe, and particularly to the laying of pipe in an excavation. When laying sectional pipe, the individual sections or tiles must be properly aligned with respect to one another and, in order to do so, the use of a pipe-supporting apparatus is desirable. In the past, such pipe-supporting apparatuses have been limited to a single post projected into the base of the excavation, with the post adapted to have releasably fastened thereto a pipe section of a given diameter.

The present invention is an improvement over the prior art, in that it provides proper support for a pipe section in an excavation, while maintaining itself in proper position during the pipe-laying operation.

As shown in FIG. 1, within the excavation 10 there is horizontally disposed a pipe section 11. Adjacent the opposite free ends of the pipe section 11 there are pipe-supporting apparatuses 12 which comprise the present invention.

In FIG. 2 the pipe-supporting device 12 is shown as consisting of a top horizontally disposed crossbar 13. The opposite ends of the crossbar 13 are connected to posts 14. The posts 14 have their free ends pointed as at 15 for easy penetration into the base 16 of the excavation 10.

Journalled on each of the posts 14 is a depth gauge 17. As shown, the depth gauge 17 includes a set screw 18 by which such gauge may be fixedly attached to each of the posts 14, as desired. As shown, the depth gauge 17 is provided with a conically shaped top 19 which is adapted to extend in the direction of the crossbar 13 when in operation.

Within the frame 12 there is a supporting and strengthening bracket 20 which consists of two struts 21 and 22 which are disposed angularly between each of the posts 14 and the crossbar 13, as shown.

At the junction between the crossbar 13 and each of the posts 14, there is a sleeve 23, the open axis of which extends perpendicularly to the confronting strut 21 or 22, as shown. Mounted on each of the struts 21 and 22 is a coaxially placed sleeve 24. Adapted to be journalled through each of the sleeves 23 and 24 is a pipe-supporting slide 25. These slides 25 are provided at their upper free ends with suitable handle-like members 26, whereby the same may be readily manipulated in the manner hereinafter described.

Referring to FIG. 5, when the pipe section 11 is placed within the excavation 10, the pipe-supporting device 12 is then placed upon the pipe section 11 with the posts 14 extending to either side thereof and the crossbar 13 extending in a spaced tangential relation to the periphery of the pipe section 11. At this point, the inner ends 27 of the pipe supporting slides 25 will be caused to bear upon the periphery of the pipe section 11. As the frame 12 is forced down over the pipe section 11, the ends 27 of the slides 25 will ride on the periphery of the pipe section 11 until they pass beneath the same in the position shown in dotted lines in FIG. 5, wherein they will be supporting the bottom of the pipe section 11. The post 14 will then be forcibly inserted into the base 16 of the excavation 10 and, while the pipe section 11 is horizontally aligned, as desired, the depth gauges 17 will be placed in position, maintaining the frame 12 in its desired relation. When the pipe section 11 is properly aligned and maintained by the pipe-supporting device 12, the excavation may be partially or fully filled with porous or granular material until the fill will normally support the pipe section 11 (see FIG. 2), at which time the slides 25 may be withdrawn from the pipe-supporting position and the frame 12 readily removed from the excavation.

In order to adapt the pipe-supporting device for use with pipe sections of varying diameters, there are provided a plurality of coaxially aligned sleeves, such as 28 and 29, on the respective struts 21 and 22, the posts 14, and crossbar 13, which receive the pipe-supporting slides 25 so as to support different diameter pipe sections 30 and 31, as shown in FIGS. 3 and 4.

The rectangular form of the frame structure consisting of the parallel posts 14 and the crossbar 13 adds rigidity and strength to the device, while facilitating the maintenance of proper horizontal alignment of the pipe sections 11 when mounted between two such frame members 12, as shown.

The dynamics of weight support between the two pipe-supporting devices 12 of this invention resists twisting or turning, or misalignment of the pipe section 11 during its support prior to the back-filling of the excavation 10 in which it is placed.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having thus described my invention, what I claim as new and desire to protect by Letters Patent is:

1. A pipe-supporting device adapted to be temporarily used during the laying and alignment of pipe sections in an excavation or the like, comprising
  (a) a pipe-supporting frame having a crossbar connected at opposite ends at right angles to a pair of depending posts,
  (b) a strengthening bracket within said frame having oppositely disposed struts extending angularly between said crossbar and each of said posts,
  (c) a pair of pipe-supporting members carried by said frame and said strengthening bracket and movable through intersecting paths relative to each other and a pipe section supported beneath said frame,
  (d) and means on said frame and said strengthening bracket through which said pipe-supporting members are free to move through intersecting paths relative to each other at a point beneath said strengthening bracket.

2. A pipe-supporting device as defined in claim 1, wherein said pipe-supporting members comprise a pair of elongated slides carried by said frame and said strengthening bracket and adapted to be moved perpendicularly to said struts with their free confronting ends intersecting beneath the wall of a pipe section adapted to be supported by said frame.

3. A pipe-supporting device as defined in claim 2 including a plurality of spaced apart sleeves carried by said crossbar and said posts and other corresponding coaxially aligned sleeves carried by said struts of said strengthening bracket, with said pipe-supporting slides adapted to be freely journalled through any set of coaxially aligned sleeves so as to have their free ends intersect beneath the wall of a pipe section having a predetermined diameter.

4. A pipe-supporting device as defined in claim 1, wherein said means on said frame and said strengthening bracket comprise spaced apart coaxially aligned sleeves through which said pipe-supporting members are freely journalled.

5. A pipe-supporting device as defined in claim 4, including a plurality of spaced apart sleeves carried by said crossbar and said posts and other corresponding coaxially aligned sleeves carried by said struts of said strengthening bracket, with said pipe-supporting members adapted to be freely journalled through any set of coaxially aligned sleeves so as to have their free ends intersect beneath the wall of a pipe section having a predetermined diameter.

* * * * *